United States Patent
Henry et al.

(10) Patent No.: US 9,532,586 B2
(45) Date of Patent: Jan. 3, 2017

(54) REDUCED SODIUM COMPOSITION

(75) Inventors: Christiani Jeya Kumar Henry, Oxford (GB); M. Rajendran a/l V. Marnickavasagar, Selangor Darul Ehsan (MY)

(73) Assignee: HOLISTA BIOTECH SDN. BHD., Petaling Jaya, Selangor Darul Ehsan (MY)

( * ) Notice: Subject to any disclaimer, the term of this patent is extended or adjusted under 35 U.S.C. 154(b) by 0 days.

(21) Appl. No.: 13/978,684

(22) PCT Filed: Jan. 5, 2012

(86) PCT No.: PCT/MY2012/000001
§ 371 (c)(1),
(2), (4) Date: Jul. 8, 2013

(87) PCT Pub. No.: WO2012/093929
PCT Pub. Date: Jul. 12, 2012

(65) Prior Publication Data
US 2013/0295266 A1    Nov. 7, 2013

(30) Foreign Application Priority Data
Jan. 6, 2011 (MY) .............................. PI2011000047

(51) Int. Cl.
A23L 1/237    (2006.01)
A23L 1/05     (2006.01)
A23L 1/0522   (2006.01)

(52) U.S. Cl.
CPC .................. *A23L 1/237* (2013.01); *A23L 1/05* (2013.01); *A23L 1/0522* (2013.01)

(58) Field of Classification Search
CPC .................................... A23L 1/05; A23L 1/237
USPC ....................................................... 426/649
See application file for complete search history.

(56) References Cited

U.S. PATENT DOCUMENTS

| | | |
|---|---|---|
| 2005/0118326 A1 | 6/2005 | Anfinsen |
| 2007/0292592 A1 | 12/2007 | Zasypkin et al. |
| 2008/0032025 A1 | 2/2008 | Fream et al. |
| 2008/0199595 A1 | 8/2008 | Zasypkin |
| 2009/0104330 A1 | 4/2009 | Zasypkin |
| 2009/0117247 A1 | 5/2009 | Felker et al. |
| 2009/0233865 A1 | 9/2009 | Kume et al. |
| 2010/0179229 A1* | 7/2010 | Matuschek et al. .......... 514/785 |
| 2010/0303853 A1* | 12/2010 | Lejeune et al. .......... 424/195.16 |

FOREIGN PATENT DOCUMENTS

| | | |
|---|---|---|
| EP | 0130822 A1 | 1/1985 |
| WO | WO2008043054 | 4/2008 |

OTHER PUBLICATIONS

International Search Report from PCT/MY2012/000001 mailed Mar. 19, 2012.
International Preliminary Report on Patentability (Chapter II) from PCT/MY2012/000001 mailed Dec. 5, 2012.
Supplementary European Search Report for Application No. EP 12732423, dated Nov. 14, 2014 (3 pages).

\* cited by examiner

*Primary Examiner* — D. Lawrence Tarazano
*Assistant Examiner* — Philip Dubois
(74) *Attorney, Agent, or Firm* — Brian C. Trinque; Lathrop & Gage LLP

(57) ABSTRACT

The present invention provides a reduced sodium composition comprising at least one potassium salt, at least one sodium salt, at least one emulsifier and at least one thickening agent. For example, the reduced sodium composition comprises at least: one potassium salt, at least one sodium salt, glycerol monostearate and maltodextrin as well as to its method of preparation. The reduced sodium composition is used for enhancing the flavor of food, as a food seasoning, food condiment and/or food additive and provides a healthier alternative to the consumer, in particular where reducing the sodium in the diet is beneficial for health.

11 Claims, No Drawings

REDUCED SODIUM COMPOSITION

FIELD OF THE INVENTION

The present invention relates to a reduced sodium composition. The composition may be used to enhance the flavour of food, as a food seasoning, condiment and/or additive, in particular where reducing the sodium in the diet is beneficial for health.

BACKGROUND OF THE INVENTION

Edible salt is used to enhance the flavour of food, as a food seasoning, food condiment and/or preserving food. Examples of edible salt include table salt or sea salt. The main component of edible salt is sodium chloride. However, excessive salt intake is linked to hypertension. Overtime, excessive sodium intake can lead to stroke, heart attack, kidney failure, and other complications. The recommended sodium intake is no more than 2300 mg a day (equivalent to about a teaspoon of table salt) for healthy adults and no more than 1500 mg a day if suffering from hypertension, kidney disease or diabetes.

Reduced sodium compositions are composed primarily of potassium salt, for example, potassium chloride. However, potassium salt confers a bitter taste and/or metallic aftertaste, which is rather unpleasant. The unpleasant taste makes the reduced salt compositions unpalatable such that consumers may avoid such reduced sodium compositions in favour of edible salt. This is of particular concern; when the consumer is required to reduce the sodium content in their diet continue to choose edible salt over reduced salt compositions despite the risks.

It is therefore desirable to minimise the unpleasant taste in reduced salt compositions.

SUMMARY OF THE INVENTION

According to a first aspect, the present invention provides a reduced sodium composition comprising at least one potassium salt, at least one sodium salt, at least one emulsifier and at least one thickening agent.

For example, the present invention provides a reduced sodium composition comprising at least one potassium salt, at least one sodium salt, glycerol monostearate and maltodextrin.

According to another aspect, the present invention provides a method of preparing a reduced sodium composition by combining at least one potassium salt, at least one sodium salt, at least one emulsifier and at least one thickening agent.

For example, the present invention provides a method of preparing a reduced sodium composition by combining at least one potassium salt, at least one sodium salt, glycerol monostearate and maltodextrin in a composition.

According to a further aspect, the present invention provides a method of masking the bitterness and/or metallic aftertaste of at least one potassium salt by using at least one emulsifier and at least one thickening agent.

For example, the present invention provides a method of masking the bitterness and/or metallic aftertaste of at least one potassium salt using glycerol monostearate and maltodextrin.

The reduced sodium composition may be used as a food seasoning, food condiment, food additive and/or for enhancing the flavour of food.

According to a further aspect, the invention provides a method of enhancing the flavour of food and/or beverage by adding to the food and/or beverage a reduced sodium composition comprising at least one potassium salt, at least one sodium salt, glycerol monostearate and maltodextrin.

DEFINITIONS

An "anti-caking agent" refers to an agent added to powdered or granulated product, for example table salt, to prevent the formation of lumps. Such agents function, for example either by adsorption of water, or by coating the powdered or granulated product to make them water repellent. Examples of anti-caking agent include tricalcium phosphate, calcium carbonate, magnesium carbonate, calcium silicate, magnesium stearate, microcrystalline cellulose and Cab-O-sil (Synonyms: silicon dioxide, synthetic amorphouse silica, pyrogenic (fumed) amorphose silica). Anti-caking agent may also be known as a flowing agent or flow conditioner.

"Comprising" is herein defined as "including principally, but not necessarily solely". Furthermore, the term "comprising" will be automatically read by the person skilled in the art as including "consisting of". The variations of the word "comprising", such as "comprise" and "comprises", have correspondingly varied meanings.

"Edible salt" refers to salt for oral consumption. Edible salt may be used in cooking and at the table. The major component of edible salt is sodium chloride. Examples of edible salt include sea salt and table salt. Sea salt is unrefined salt obtained by evaporating the water from saltwater from the sea, ocean, rivers or lakes. The major component of sea salt is sodium chloride but sea salt may contain other minerals like iron, sulphur, magnesium and other trace elements. Table salt refers to edible salt that has been purified or refined. Due to the refining process, most other minerals are removed from table salt. Table salt comprises highly refined sodium chloride (up to ~99.9%). In addition, iodide (for nutrition), stabilisers and anti-caking agents are often added to table salt.

An emulsifier refers to a substance capable of stabilising a mixture of at least two liquids that are not normally miscible to form an emulsion.

Food refers to any substance eaten or drunk to provide nutrition for the body or for pleasure.

A "stabilising agent" refers to a substance which is added to reduce chemical changes and thus maintains the stability of a composition and/or its components. Examples of stabilising agents include sodium thiosulphate, calcium hydroxide.

A "trace amount" of a substance refers to a small amount. In analytical terms, a trace amount of a substance in general means that a substance is detected but not quantifiable. For example, amounts of less than 1 part per million is considered to be a trace amount.

A "thickening agent" refers to a substance capable of increasing the viscosity of a solution or liquid/solid mixture without substantially modifying its other properties.

DETAILED DESCRIPTION OF THE INVENTION

According to a first aspect, the present invention provides a reduced sodium composition comprising at least one potassium salt, at least one sodium salt, at least one emulsifier and at least one thickening agent.

According to another aspect, the present invention provides a method of preparing a reduced sodium composition by combining at least one potassium salt, at least one sodium salt, at least one emulsifier and at least one thickening agent.

According to a further aspect, the present invention provides a method of masking the bitterness and/or metallic aftertaste of at least one potassium salt by using at least one emulsifier and at least one thickening agent.

Any edible potassium salt having a salty taste may be used in the reduced sodium composition. For example, potassium chloride or potassium citrate may be used in the reduced sodium composition. In particular, potassium chloride may be used in the reduced sodium composition.

Any suitable emulsifier and thickening agent may be used for the invention. For example, the emulsifier may be selected from the group of emulsifiers listed in Table 1.

TABLE 1

List of emulsifiers

| | |
|---|---|
| 1 | Lecithins |
| 2 | Polyoxyethylene (40) stearate |
| 3 | Polyoxyethylene sorbitan monolaurate (Polysorbate 20) |
| 4 | Polyoxyethylene sorbitan monooleate (Polysorbate 80) |
| 5 | Polyoxyethylene sorbitan monopalmitate (Polysorbate 40) |
| 6 | Polyoxyethylene sorbitan monostearate (Polysorbate 60) |
| 7 | Polyoxyethylene sorbitan tristearate (Polysorbate 65) |
| 8 | Ammonium phosphatides |
| 9 | Mono- and diglycerides of fatty acids |
| 10 | Acetic acid esters of mono- and diglycerides of fatty acids (e.g. Acetem) |
| 11 | Lactic acid esters of mono- and diglycerides of fatty acids (e.g. LACTEM) |
| 12 | Citric acid esters of mono- and diglycerides of fatty acids (e.g. Citrem) |
| 13 | Tartaric acid esters of mono- and diglycerides of fatty acids |
| 14 | Diacetyl tartaric acid esters of mono- and diglycerides of fatty acids (e.g. DATEM) |
| 15 | Sucrose esters of fatty acids |
| 16 | Sucroglycerides |
| 17 | Polyglycerol esters of fatty acids |
| 18 | Polyglycerol polyricinoleate |
| 19 | Propane-1,2-diol esters of fatty acids |
| 20 | Sodium stearoyl-2-lactylate |
| 21 | Calcium stearoyl-2-lactylate |
| 22 | Stearyl tartrate |
| 23 | Sorbitan monostearate |
| 24 | Sorbitan tristearate |
| 25 | Sorbitan monolaurate |
| 26 | Sorbitan monooleate |
| 27 | Sorbitan monopalmitate |
| 28 | Sorbitan trioleate |
| 29 | Glycerol monostearate |

As examples, the thickening agent may be selected from the group of thickening agents listed in Table 2.

TABLE 2

List of thickening agents

| | |
|---|---|
| 1 | Alginic acid |
| 2 | Sodium alginate |
| 3 | Potassium alginate |
| 4 | Ammonium alginate |
| 5 | Calcium alginate |
| 6 | Propylene glycol alginate (propane-1,2-diol alginate) |
| 7 | Agar |
| 8 | Carrageenan (including furcelleran) |
| 9 | Processed Euchema Seaweed |
| 10 | Bakers yeast glycan |
| 11 | Arabinogalactan |
| 12 | Locust bean gum |
| 13 | Oat gum |
| 14 | Guar gum |
| 15 | Tragacanth gum |
| 16 | Gum arabic (Acacia gum) |
| 17 | Xanthan gum |
| 18 | Karaya gum |
| 19 | Tara gum |
| 20 | Gellan gum |
| 21 | Gum ghatti |
| 22 | Curdlan gum |
| 23 | Konjac flour |
| 24 | Soybean hemicellulose |
| 25 | Pectin |
| 26 | Cellulose |
| 27 | Microcrystalline cellulose |
| 28 | Powdered cellulose |
| 29 | Methyl cellulose |
| 30 | Ethyl cellulose |
| 31 | Hydroxypropyl cellulose |
| 32 | Hydroxypropyl methyl cellulose |
| 33 | Methyl ethyl cellulose |
| 34 | Sodium carboxymethyl cellulose |
| 35 | Ethyl hydroxyethyl cellulose |
| 36 | Cross-linked sodium carboxymethyl cellulose |
| 37 | Sodium carboxymethyl cellulose, enzymatically hydrolysed |
| 38 | Maltodextrin |

In particular, any combination of an emulsifier and a thickening agent may be used for the invention. It was surprisingly found that the emulsifier and thickening agent are able to mask the bitterness and/or metallic aftertaste of the potassium salt.

According to a particular aspect, the invention provides a reduced sodium composition comprising at least one potassium chloride, at least one sodium salt, glycerol monostearate and maltodextrin.

Alternatively, the reduced salt composition may comprise two or more of each of the ingredients. Accordingly the reduced salt composition may comprise any combination of two or more potassium salts, two or more sodium salts, two or more emulsifiers and two or more thickening agents.

The reduced sodium composition may comprise, (in % w/w):
5-80% potassium salt;
>0-93% sodium salt;
1-20% emulsifier;
1-20% thickening agent.

The amount of potassium salt in the reduced sodium salt composition is in the range of 5-80% (w/w). The amount of potassium in the reduced sodium salt composition may be any percentage within this range, for example, the amount of potassium salt may be at least 5%, 7.5%, 10%, 12.5%, 15%, 17.5%, 20%, 22.5%, 25%, 27.5%, 30%, 32.5%, 35%, 37.5%, 40%, 42.5%, 45%, 47.5%, 50%, 52.5%, 55%, 57.5%, 60%, 62.5%, 65%, 67.5% 70%. 72.5%, 75%, 77.5% or 80% w/w. The amount of emulsifier in the reduced sodium salt composition is in the range of 1-20% (w/w). The amount of emulsifier in the reduced sodium salt composition may be any percentage within this range, for example, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5% or 20% w/w. The amount of thickening agent in the reduced sodium salt composition may be in the range of 1-20%. (w/w). The amount of thickening agent may also be any percentage within this range, for example, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5% or 20% w/w. The reduced sodium salt composition according to the invention may comprise of >0-93% sodium salt. In particular, the reduced sodium salt composition may comprise 0.01%, 0.05%, 0.1%, 0.5%, 1%, 2.5%, 5%, 7.5%, 10%, 12.5%, 15%, 20%, 22.5%, 25%, 27.5%, 30%, 32.5%. 35%, 37.5%, 40%, 42.5%, 45%, 47.5%, 50%, 52.5%, 55%, 60%, 62.5%, 65%, 67.5%, 70%, 72.5%, 75%, 77.5%, 80%, 82.5%, 85%, 87.5%, 90% or 93% sodium salt. The sodium salt may be any edible sodium salt. In particular, the sodium salt comprises sodium chloride.

In particular, the composition of the present invention may be a reduced sodium composition, with the bitterness and/or metallic aftertaste of the potassium salt masked by the glycerol monostearate and maltodextrin. In particular, it was surprisingly found that glycerol monostearate and maltodextrin are able to mask the bitterness and/or metallic aftertaste of potassium salt. The amount of potassium salt in the reduced sodium salt composition is in the range of 5-80% (w/w). The amount of potassium in the reduced sodium salt composition may be any percentage within this range, for example, the amount of potassium salt may be at least 5%, 7.5%, 10%, 12.5%, 15%, 17.5%, 20%, 22.5%, 25%, 27.5%, 30%, 32.5%, 35%, 37.5%, 40%, 42.5%, 45%, 47.5%, 50%, 52.5%, 55%, 57.5%, 60%, 62.5%, 65%, 67.5% 70%. 72.5%, 75%, 77.5% or 80% w/w. The amount of glycerol monostearate in the reduced sodium salt composition is in the range of 1-20% (w/w). The amount of glycerol monostearate in the reduced sodium salt composition may be any percentage within this range, for example, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5% or 20% w/w. The amount of maltodextrin in the reduced sodium salt composition may be in the range of 1-20%. (w/w). The amount of maltodextrin may also be any percentage within this range, for example, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5% or 20% w/w. The reduced sodium salt composition according to the invention may comprise of >0-93% sodium salt. In particular, the reduced sodium salt composition may comprise 0.01%, 0.05%, 0.1%, 0.5%, 1%, 2.5%, 5%, 7.5%, 10%, 12.5%, 15%, 20%, 22.5%, 25%, 27.5%, 30%, 32.5%. 35%, 37.5%, 40%, 42.5%, 45%, 47.5%, 50%, 52.5%, 55%, 60%, 62.5%, 65%, 67.5%, 70%, 72.5%, 75%, 77.5%, 80%, 82.5%, 85%, 87.5%, 90% or 93% sodium salt. The sodium salt may be any edible sodium salt. In particular, the sodium salt comprises sodium chloride.

Accordingly, the reduced sodium composition may comprise, (in % w/w):
5-80% potassium salt;
>0-93% sodium salt;
1-20% glycerol monostearate;
1-20% maltodextrin.

Glycerol monostearate and maltodextrin are able to mask the bitterness and/or metallic aftertaste of a composition comprising 5%, 7.5%, 10%, 12.5%, 15%, 17.5%, 20%, 22.5%, 25%, 27.5%, 30%, 32.5%, 35%, 37.5%, 40%, 42.5%, 45%, 47.5%, 50%, 52.5%, 55%, 57.5%, 60%, 62.5%, 65%, 67.5% 70%. 72.5%, 75%, 77.5%. and up to 80% w/w potassium salt.

The reduced sodium composition may comprise any percentage of sodium salt within the range of >0-93%. For example, the reduced sodium composition may comprise 0.01 to 93% sodium salt. In particular, the reduced sodium composition may comprises 0.01 to 70% sodium salt. As further examples, the reduced sodium composition may comprise 0.01%, 0.05%, 0.1%, 0.5%, 1%, 2.5%, 5%, 7.5%, 10%, 12.5%, 15%, 20%, 22.5%, 25%, 27.5%, 30%, 32.5%. 35%, 37.5%, 40%, 42.5%, 45%, 47.5%, 50%, 52.5%, 55%, 60%, 62.5%, 65%, 67.5%, 70%, 72.5%, 75%, 77.5%, 80%, 82.5%, 85%, 87.5%, 90% or 93% sodium salt. The sodium salt may be any edible sodium salt. In particular, the sodium salt comprises sodium chloride.

According to a particular example, the reduced sodium composition according to the invention comprises (in % w/w):
54-62% potassium salt;
34-38% sodium salt;
2-4% glycerol monostearate;
2-4% maltodextrin.

The composition according to any aspect of the invention may also include an iodide, for example potassium iodide, as a source of iodine, an important nutrient for thyroid function. For example, the amount of iodide in the composition may be from 0.01% to 0.06% (w/w). The composition may further include at least one stabilising agent, anti-caking agent and the like. Stabilising agents, anti-caking agents, and the like are well-known to any skilled person in the art. For example, an anti-caking agent may be tricalcium phosphate. These agents may be present in trace amounts.

The reduced sodium composition according to any aspect of the invention may be in solid form. Alternatively, the reduced sodium composition according to any aspect of the invention may be dissolved in a liquid, for example, water.

The reduced sodium composition may be stored in a package. In addition, the reduced sodium composition may be stored in a container suitable for pouring, such as a shaker. When the contents within the shaker have been used up, it may be refilled from the package. The liquid composition may be stored in a container, for example a sauce bottle. The invention also includes a package and/or container comprising the reduced sodium composition according to any aspect of the invention.

The reduced sodium composition according to any aspect of the invention may be added to enhance the flavour of food and/or beverage. The reduced sodium composition may be added during food manufacturing, food preparation and/or cooking. The reduced sodium composition may be used in a home kitchen. The reduced sodium composition may also be used in food preparation and/or processing premises, such as commercial kitchens, factories and the like. Alternatively, the reduced sodium composition may be added by the person consuming the food at the table.

The reduced sodium composition may be used on any type of food and/or beverage requiring flavour enhancement, such as soups, broths, juices, vegetables, fish, chicken, meat, sauces and the like. Accordingly, the invention also provides a food and/or beverage comprising the reduced sodium composition according to any aspect of the invention.

Using the reduced sodium composition according to any aspect of the invention to replace edible salt comprising predominantly of sodium chloride provides a healthier alternative to the consumer, in particular where reducing the sodium in the diet is beneficial for health.

Having now generally described the invention, the same will be more readily understood through reference to the following examples which are provided by way of illustration, and are not intended to be limiting of the present invention.

EXAMPLES

Example 1

A reduced sodium composition was prepared according to the following formulation:

TABLE 3

Example of a formulation of a reduced sodium composition

| Component | Amount (% w/w) |
| --- | --- |
| Potassium chloride | 58 |
| Sodium chloride | 36 |
| Glycerol monostearate | 3 |
| Maltodextrin | 3 |

The composition may also comprise of the components listed in Table 3 above and at least one anti-caking agent and/or stabilising agent.

In particular, the composition comprises the components listed in Table 3 above and an anti-caking agent. In particular, the anti-caking agent used in the composition is tricalcium phosphate.

Example 2

Sensory testing was performed to compare the reduced sodium composition according to the present invention, commercially available salt (Pure Vacuum Salt)(Pure Vacuum Salt is sold by Seng Hin Brothers Enterprises Sdn. Bhd. Address: Lot 156 Rawang Intergrated Industrial Park, 48000 Rawang, Selangor Darul Ehsan, Malaysia), potassium chloride and commercially available low-sodium salt (Saxa Lite)(Saxa Lite is made in Australia by Salpak Pty. Ltd. Address: 92-96 Station Road, Seven Hills New South Wales 2147 Australia). The sensory testing was subjected to consumer acceptance taste testing for "overall desirability" by a panel of 25 untrained judges in French fries.

Four packs of unsalted French Fries were obtained from a fast food outlet (McDonald's). Each of the four test salts were added separately to a different pack of the French fries and labeled Sample A, Sample B, Sample C and Sample D, as indicated in Table 4.

TABLE 4

Test salt added to the different samples of French fries

| Sample | Test salt |
| --- | --- |
| Sample A (Positive Control) | commercially available salt (Pure Vaccum Salt) |
| Sample B (Negative Control) | potassium chloride |
| Sample C | commercially available low-sodium salt (Saxa Lite) |
| Sample D | reduced sodium composition according to formulation of Table 3. |

The 25 judges were requested to rate the "overall desirability" of the samples, with each judge allowed to vote more than once, but no more than four times.

The voting results were shown in Table 5 below.

TABLE 5

Voting results for sensory test

| Sample | Desirable | Not Desirable | Indifferent |
| --- | --- | --- | --- |
| Sample A | 16 | 0 | 9 |
| Sample B | 0 | 20 | 5 |
| Sample C | 4 | 6 | 15 |
| Sample D | 15 | 1 | 9 |

The judges were asked to vote for the sensory test as: desirable, not desirable or indifferent.

The results showed that no judge in the panel voted for Sample B (potassium chloride) as desirable. The number of votes for Sample D (reduced sodium composition according to Table 3) was almost the same as that for Sample A (commercially available salt, Pure Vacuum salt), suggesting that the panel found the reduced sodium composition of the present invention have the same "overall desirability" as the commercially available salt (Pure Vacuum salt). In addition, 6 judges who voted for Sample C (commercially available low-sodium salt (Saxa Lite)) find it undesirable and unsalty. However, they were unable to detect any undesirable bitter and/or metallic taste despite the presence of potassium chloride in the composition.

The results also suggest that the panel prefer Sample D (reduced sodium composition according to the invention), with 15 votes; to Sample C (the commercially available low sodium salt, Saxa), with 4 votes.

Overall, this sensory test suggests that Sample D (reduced sodium composition according to the present invention) was received well by the panel of untrained judges.

Example 3

Sensory testing was performed to compare the reduced sodium composition according to the present invention with different combinations of emulsifiers and thickening agents, as shown in Table 6. The sensory testing was subjected to consumer acceptance taste testing for "overall desirability" by a panel of 19 untrained judges in French fries.

Six packs of unsalted French Fries were obtained from a fast food outlet (McDonald's). Each of the six test salts were added separately to a different pack of the French fries and labeled Sample 1, Sample 2, Sample 3, Sample 4, Sample 5 and Sample 6 as indicated in Table 6.

A panel of 19 judges were requested to rate the "overall desirability" of the samples in a sensory test, with each judge allowed to vote more than once, but no more than six times. For the sensory test, the judges were asked to vote if the taste was: desirable, not desirable or indifferent.

The results showed that Sample 1, Sample 2, Sample 3, Sample 5 and Sample 6 are acceptable to all the judges and they were unable to detect any undesirable bitter and/or metallic taste despite the presence of potassium chloride in the composition. (Table 7)

Overall, this sensory test suggests that all the samples were received well by the panel of judges.

TABLE 6

Test salt added to the different samples of French fries

| | Sodium Chloride (%) | Potassium Chloride (%) | Emulsifier (%) | | | Thickening agent (%) | | Anticaking agent (%) |
| | | | Glycerol monostearate | Sorbitan monostearate | Sodium stearoyl-2-lactylate | Maltodextrin | Pectin | |
|---|---|---|---|---|---|---|---|---|
| Sample 1 | 57 | 33 | — | 6 | — | 3.5 | — | 0.5 |
| Sample 2 | 57 | 33 | 3 | 3 | — | 3.5 | — | 0.5 |
| Sample 3 | 57 | 33 | 6 | — | — | 1.75 | 1.75 | 0.5 |
| Sample 4 | 100 | — | — | — | — | — | — | — |
| Sample 5 | 57 | 33 | 6 | — | — | 3.5 | — | 0.5 |
| Sample 6 | 57 | 33 | — | — | 6 | 3.5 | — | 0.5 |

TABLE 7

Voting results for sensory test

| | Sample 1 | | | Sample 2 | | | Sample 3 | | | Sample 4 | | | Sample 5 | | | Sample 6 | | |
| Criteria | D | ND | Indif | D | ND | Indif | D | ND | Indif | D | ND | Indif | D | ND | Indif | D | ND | Indif |
|---|---|---|---|---|---|---|---|---|---|---|---|---|---|---|---|---|---|---|
| No. of Vote | 10 | 2 | 7 | 15 | 1 | 3 | 8 | 7 | 4 | 7 | 1 | 11 | 6 | 2 | 11 | 7 | 3 | 9 |

Note:
D is Desirable
ND is Not Desirable
Indif is Indifferent
Sample 4 is Table Salt

The invention claimed is:

1. A reduced sodium composition comprising at least one potassium salt, at least one sodium salt, at least one emulsifier, wherein the emulsifier is glycerol monostearate and wherein the glycerol monostearate is present in a proportion of 6%, and at least one thickening agent, wherein the thickening agent is maltodextrin and wherein the maltodextrin is present in a proportion of 3.5-4%.

2. The reduced sodium composition according to claim 1, comprising:
   5-80% potassium salt;
   >0-93% sodium salt;
   6% glycerol monostearate; and
   3.5-4% maltodextrin.

3. The reduced sodium composition according claim 1, wherein the potassium salt comprises potassium chloride or potassium citrate or wherein the sodium salt comprises sodium chloride.

4. The reduced sodium composition according to claim 1, further comprising at least one anti-caking agent or stabilising agent.

5. The reduced sodium composition according to claim 1 having less sodium salt content than edible salt.

6. The reduced sodium composition according to claim 5, wherein the edible salt comprises about 99.9% sodium chloride.

7. The reduced sodium composition according to claim 1, wherein the emulsifier and the thickening agent mask the bitterness or metallic aftertaste of the potassium salt.

8. The reduced sodium composition according to claim 1, wherein the reduced sodium composition is in the solid form.

9. The reduced sodium composition according to claim 1, comprising:
   15-35% potassium salt;
   55-75% sodium salt;
   6% glycerol monostearate; and
   3.5-4% maltodextrin.

10. The reduced sodium composition according to claim 1, comprising:
    15% potassium salt;
    75% sodium salt;
    6% glycerol monostearate; and
    4% maltodextrin.

11. The reduced sodium composition according to claim 1, comprising:
    15% potassium salt;
    75% sodium salt;
    6% glycerol monostearate;
    3.5% maltodextrin; and
    0.5% magnesium stearate.

* * * * *